(12) United States Patent
Koizumi et al.

(10) Patent No.: US 9,973,043 B2
(45) Date of Patent: May 15, 2018

(54) CONTACTLESS POWER SUPPLY DEVICE AND CONTACTLESS POWER RECEIVING DEVICE

(71) Applicant: Panasonic Intellectual Property Management Co., Ltd., Osaka (JP)

(72) Inventors: Masayoshi Koizumi, Kanagawa (JP); Osamu Ohashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 183 days.

(21) Appl. No.: 14/898,706

(22) PCT Filed: Jun. 26, 2014

(86) PCT No.: PCT/JP2014/003423
§ 371 (c)(1),
(2) Date: Dec. 15, 2015

(87) PCT Pub. No.: WO2015/004870
PCT Pub. Date: Jan. 15, 2015

(65) Prior Publication Data
US 2016/0134162 A1 May 12, 2016

(30) Foreign Application Priority Data
Jul. 11, 2013 (JP) .................................. 2013-145239

(51) Int. Cl.
*B60L 1/00* (2006.01)
*H02J 50/60* (2016.01)
(Continued)

(52) U.S. Cl.
CPC ............... *H02J 50/60* (2016.02); *B60L 11/18* (2013.01); *B60L 11/182* (2013.01);
(Continued)

(58) Field of Classification Search
CPC .... G02B 6/0018; G02B 6/0028; G02B 6/006; G02B 6/0068; B23K 9/1093; B23K 26/211; B23K 26/34; B23K 26/342
See application file for complete search history.

(56) References Cited

U.S. PATENT DOCUMENTS

2009/0122419 A1* 5/2009 Takei ....................... H01F 7/066
359/694
2012/0033710 A1* 2/2012 Kim ........................ G01K 5/62
374/161
(Continued)

FOREIGN PATENT DOCUMENTS

DE 202009009689 U1 12/2010
EP 1 944 851 A2 7/2008
(Continued)

OTHER PUBLICATIONS

European Search Report dated Jun. 1, 2016 for the related European Patent Application No. 14822804.2.
(Continued)

*Primary Examiner* — Sibin Chen
(74) *Attorney, Agent, or Firm* — Pearne & Gordon LLP

(57) ABSTRACT

Disclosed is a contactless power supply device which supplies power in a contactless manner, and adopts a configuration including a power supply coil that generates an electromagnetic field and supplies power, a case that houses the power supply coil, a wire that dissolves at a temperature below a heat-resistant temperate of the case, a dissolution detection unit that detects dissolution of the wire, and a controller that performs control based on a detection result of the dissolution detection unit.

17 Claims, 14 Drawing Sheets

(51) Int. Cl.
*H02J 50/90* (2016.01)
*H02J 50/80* (2016.01)
*B60L 11/18* (2006.01)
*B60M 7/00* (2006.01)
*H02J 17/00* (2006.01)
*H02J 7/02* (2016.01)
*H02J 50/10* (2016.01)
*H02J 50/05* (2016.01)
*H02J 50/12* (2016.01)

(52) U.S. Cl.
CPC .......... *B60L 11/1824* (2013.01); *B60M 7/003* (2013.01); *H02J 7/025* (2013.01); *H02J 17/00* (2013.01); *H02J 50/10* (2016.02); *H02J 50/80* (2016.02); *H02J 50/90* (2016.02); *H02J 50/05* (2016.02); *H02J 50/12* (2016.02)

(56) References Cited

U.S. PATENT DOCUMENTS

2012/0112531 A1* 5/2012 Kesler .................. B60L 11/182
  307/9.1
2012/0326662 A1 12/2012 Matsumoto et al.
2014/0185175 A1* 7/2014 Murphy ................ H01H 37/52
  361/104

FOREIGN PATENT DOCUMENTS

| JP | 61-160032 | 7/1986 |
| JP | 2-195218 | 8/1990 |
| JP | 7-301571 | 11/1995 |
| JP | 2008-312434 | 12/2008 |
| JP | 2009-254116 | 10/2009 |
| JP | 2012-055109 | 3/2012 |
| JP | 2012-089618 | 5/2012 |
| WO | 2012/047779 A1 | 4/2012 |

OTHER PUBLICATIONS

International Search Report of PCT application No. PCT/JP2014/003423 June dated Sep. 22, 2014.
English Translation of Chinese Search Report dated Sep. 4, 2017 for the related Chinese Patent Application No. 201480038543.0.

* cited by examiner

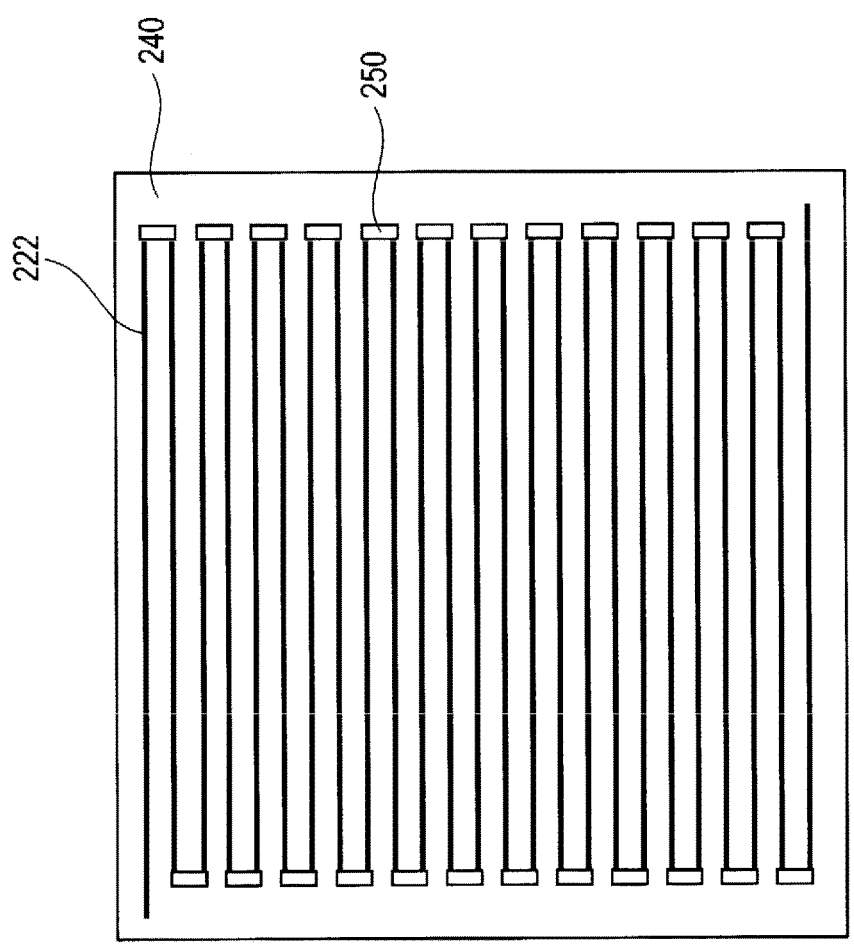

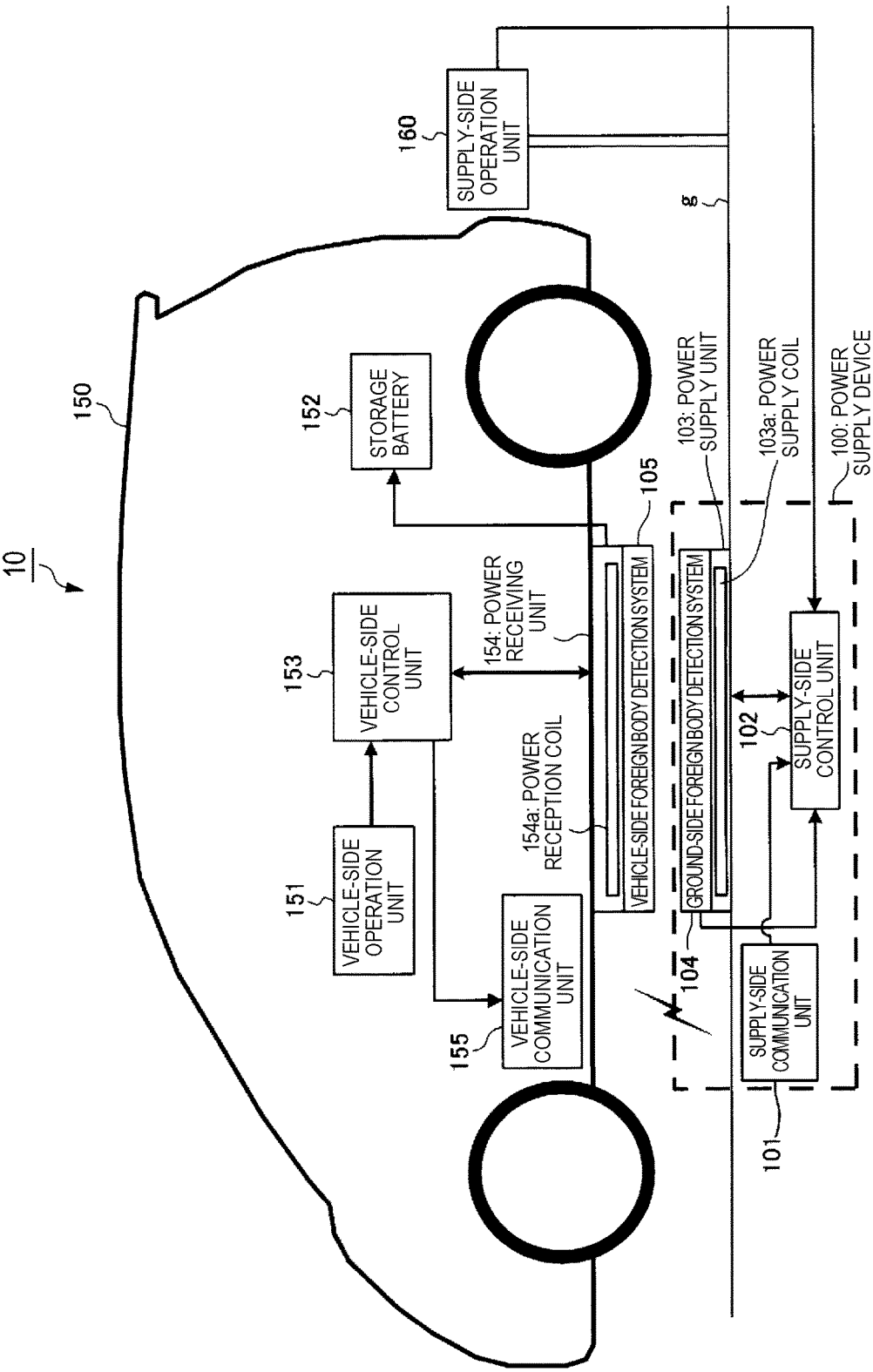

CONTACTLESS POWER SUPPLY DEVICE AND CONTACTLESS POWER RECEIVING DEVICE

CROSS-REFERENCE TO RELATED APPLICATIONS

This application is a U.S. national stage application of the PCT International Application No. PCT/JP2014/003423 filed on Jun. 26, 2014, which claims the benefit of foreign priority of Japanese patent application 2013-145239 filed on Jul. 11, 2013, the contents all of which are incorporated herein by reference.

TECHNICAL FIELD

The present invention relates to a contactless power supply device, and a contactless power receiving device, which detect a foreign object.

BACKGROUND ART

In recent years, vehicles that travel by electricity (hereinafter, simply referred to as "vehicle") such as electric vehicles (EV) and plug-in hybrid vehicles (PHEV) have been widespread. Such a vehicle is equipped with a large-capacity storage battery, stores electric energy supplied from the outside in the storage battery, and travels by using the stored electric energy.

Meanwhile, mobile phones (including so-called smart phones, and the like), notebook computers, tablets or the like have been widespread. Such a mobile terminal is also equipped with a storage battery, and charging to the storage battery and discharging from the storage battery are performed.

As a method for supplying power to a storage battery that is mounted in such a vehicle, a mobile terminal, and the like, there is a method for supplying power in a contactless manner using an electromagnetic force between a primary coil of a power supply device and a secondary coil of a power receiving device. In this method, if metal such as a coin is present between the power supply device and the power receiving device, an induced current is generated in the metal by a magnetic flux generated between the power supply device and the power receiving device, and this results in heat generation in the metal. As a result, there is a concern that a case is melted, or fire occurs.

Therefore, a technique for detecting such a foreign metal body (hereinafter, simply referred to as "foreign object") is disclosed in, for example, PTL 1.

PTL 1 discloses a power supply device which includes a light emitting member and a light receiving member which are provided on a primary coil side, and a light guiding member such as an optical fiber provided on a secondary coil side, if there is no foreign object in a gap between the primary coil and the secondary coil, light from the light emitting member is received by the light receiving member through the light guide member; and if a foreign object is trapped in the gap, light from the light emitting member is blocked by the foreign object and the light is not received by the light receiving member, and the excitation of the primary coil is stopped.

CITATION LIST

Patent Literature

PTL 1; Japanese Patent Unexamined Publication No. 2009-254116

SUMMARY OF THE INVENTION

However, in the power supply device disclosed in PTL 1 described above, if there is mud, water droplets, dirt, or the like, there is a trouble in which the mud or the like is erroneously detected as a foreign object, and it is not possible to accurately detect the foreign object.

An object of the present invention is to provide a contactless power supply device and a contactless power receiving device, which detects a foreign object, regardless of the adhesion of dirt.

A contactless power supply device according to an embodiment of the present invention is a contactless power supply device which supplies power in a contactless manner, and adopts a configuration including a power supply coil that generates an electromagnetic field and supplies power, a case that houses the power supply coil, a wire that dissolves at a temperature below a heat-resistant temperature of the case, a dissolution detection unit that detects dissolution of the wire, and a controller that performs control based on a detection result of the dissolution detection unit.

A contactless power receiving device according to another embodiment of the present invention is a contactless power receiving device which receives power in a contactless manner, and adopts a configuration including a power receiving coil that receives power by an electromagnetic field that is caused by a power supply device, a case that houses the power receiving coil, a wire that dissolves at a temperature below a heat-resistant temperature of the case, a dissolution detection unit that detects dissolution of the wire, and a controller that performs control based on a detection result of the dissolution detection unit.

According to the present invention, it is possible to detect a heat-generating foreign object, regardless of the adhesion of dirt.

BRIEF DESCRIPTION OF DRAWINGS

FIG. 16 is a top view illustrating a configuration of a ground-side foreign object detection system in Variation 4 of the arrangement of a wire.

FIG. 17 is a block diagram illustrating another configuration of a charging system according to an exemplary embodiment of the present invention.

DESCRIPTION OF EMBODIMENTS

Figure 1:
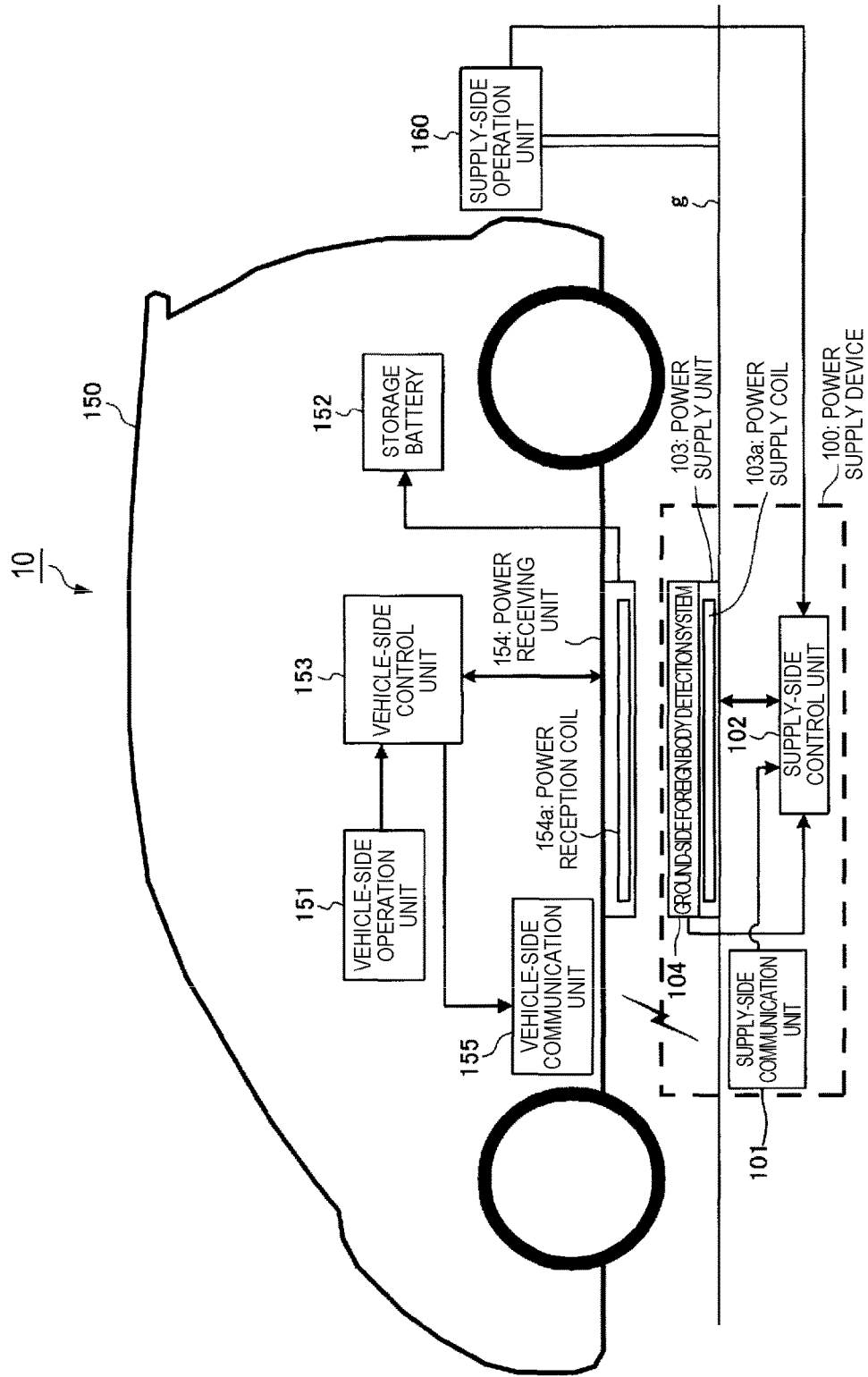
FIG. 1 is a block diagram illustrating a configuration of a charging system according to an exemplary embodiment of the present invention.

Hereinafter, embodiments of the present invention will be described in detail with reference to the drawings.

(Exemplary Embodiment)

<Configuration of Charging System>

The configuration of charging system 10 according to an exemplary embodiment of the present invention will be described with reference to FIG. 1.

Charging system 10 includes power supply device 100, vehicle 150, and supply-side operation unit 160. In addition, FIG. 1 illustrates a power supply-possible state in which power supply coil 103a and power receiving coil 154a face each other.

Power supply device 100 is installed on or embedded in the ground such that power supply unit 103 is exposed from ground surface g. Power supply device 100, for example, is provided in a parking space, and faces power receiving unit 154 and supplies power to power receiving unit 154, during parking of vehicle 150. Here, power supply means that power is supplied from power supply coil 103a to power receiving coil 154a. Further, the configuration of power supply device 100 will be described later.

Vehicle 150 is, for example, a vehicle traveling by the power of storage battery 152, such as a hybrid electric vehicle (HEV), a plug-in electric vehicle (PEV), or an electric vehicle (EV). Further, the configuration of vehicle 150 will be described later in detail.

Supply-side operation unit 160 outputs a power supply start signal indicating the start of power supply or a power supply stop signal indicating the stop of power supply, to power supply device 100, in response to an operation from the outside.

<Configuration of Vehicle>

Vehicle 150 is mainly configured with vehicle-side operation unit 151, storage battery 152, vehicle-side controller 153, power receiving unit 154, and vehicle-side communication unit 155.

Vehicle-side operation unit 151 receives various operations from the user, and outputs various signals corresponding to the received operation to vehicle-side controller 153.

Storage battery 152 stores the power supplied from power supply device 100 through power receiving unit 154.

Vehicle-side controller 153 controls power receiving unit 154 and vehicle-side communication unit 155 so as to perform various processes associated with supply or various processes associated with supply stop, based on various signals that are input from vehicle-side operation unit 151.

Power receiving unit 154 includes power receiving coil 154a. Power receiving coil 154a receives power supplied from power supply coil 103a of power supply unit 103. Power receiving unit 154 supplies power, that has been received by power receiving coil 154a, to storage battery 152, in response to the control of vehicle-side controller 153. Power receiving unit 154 is provided in a state of being exposed to the outside, at the bottom of vehicle 150.

Vehicle-side communication unit 155 generates a charging permission signal to allow charging or a charging non-permission signal to not allow charging, in response to the control of vehicle-side controller 153, and transmits the generated charging permission signal or the generated charging non-permission signal, to supply-side communication unit 101. Here, the charging non-permission signal is transmitted, for example, when a positional deviation is detected during power supply, or storage battery 152 is in a state of being fully charged.

<Configuration of Power Supply Device>

Power supply device 100 is mainly configured with supply-side communication unit 101, supply-side controller 102, power supply unit 103, and ground-side foreign object detection system 104.

Supply-side communication unit 101 receives the charging permission signal or the charging non-permission signal from vehicle-side communication unit 155, and outputs the received charging permission signal or the received charging non-permission signal to supply-side controller 102.

When the power supply start signal is input from supply-side operation unit 160, and the charging permission signal is input from supply-side communication unit 101, supply-side controller 102 controls power supply unit 103 so as to perform power supply from power supply coil 103a to power receiving coil 154a.

When the supply stop signal is input from supply-side operation unit 160, the charging non-permission signal is input from supply-side communication unit 101, or the detection of a foreign object is notified from ground-side foreign object detection system 104, during power supply, supply-side controller 102 controls power supply unit 103 so as not to start power supply or so as to stop power supply.

Power supply unit 103 includes power supply coil 103a. Power supply unit 103 performs power supply from power supply coil 103a to power receiving coil 154a, in response to the control of supply-side controller 102. Power supply unit 103 supplies power, for example, according to an electromagnetic induction method, an electric resonance method, or a magnetic resonance method.

In ground-side foreign object detection system 104, wires are arranged in a spiral shape, and dissolve at a temperature below a heat-resistant temperature of a case (housing) that houses power supply coil 103a, and a foreign object is detected if the wires dissolve, and supply-side controller 102 is notified of the detection of a foreign object. Further, ground-side foreign object detection system 104 will be described in detail later.

<Configuration of Power Supply Unit>

The configurations of power supply unit 103 and ground-side foreign object detection system 104 illustrated in FIG. 1 will be described with reference to FIG. 2.

Power supply unit 103 is mainly configured with switching unit 201, AC/DC conversion unit 202, inverter 203, and power supply coil 103a.

Switching unit 201 opens or closes the connection between an external power source that supplies AC power and AC/DC conversion unit 202, in response to the control of supply-side controller 102.

AC/DC conversion unit 202 converts AC power supplied from the external power source into DC power through switching unit 201, in response to the control of supply-side controller 102, and outputs the DC power to inverter 203.

Inverter 203 converts DC power supplied from the AC/DC conversion unit 202 into AC power, in response to the control of supply-side controller 102, and outputs the AC power to power supply coil 103a.

Power supply coil 103a performs power supply by receiving the AC power from inverter 203, and generating an electromagnetic field (including flux) for power receiving coil 154a.

Ground-side foreign object detection system 104 is mainly configured with disconnection detection unit 221 (corresponding to dissolution detection unit), and wire 222, and disconnection detection unit 221 is mainly configured with transmission unit 231, and receiving unit 232.

Disconnection detection unit 221 transmits a signal (an optical signal, an electrical signal, or the like) from transmission unit 231, in response to the control of supply-side controller 102, and receives a signal that has passed through wire 222 at receiving unit 232. When receiving unit 232 can no longer receive a signal, disconnection detection unit 211 detects that wire 222 dissolves and is disconnected, and causes supply-side controller 102 to stop the supply of power to power receiving unit 154.

Wire 222 is a signal line such as an optical fiber or a non-magnetic metal wire (for example, a copper wire) which dissolves at a temperature below a heat-resistant temperature of a case that houses power supply coil 103a, and is arranged in a spiral shape on power supply coil 103a. Wire 222 transmits the signal sent from transmission unit 231 to receiving unit 232. When a foreign object is present on wire 222, the foreign object generates heat by the magnetic flux generated from power supply device 100, and wire 222 dissolves before the case dissolves. Since an optical fiber or the like is used as wire 222, it is possible to detect a foreign object without affecting the power supply to power receiving unit 154.

It should be noted that, when wire 222 is the optical fiber, transmission unit 231 is a light emitting unit that transmits optical signals, and receiving unit 232 is a light receiving unit that receives the optical signals.

<Operation of Supply-Side Controller>

Figure 2:
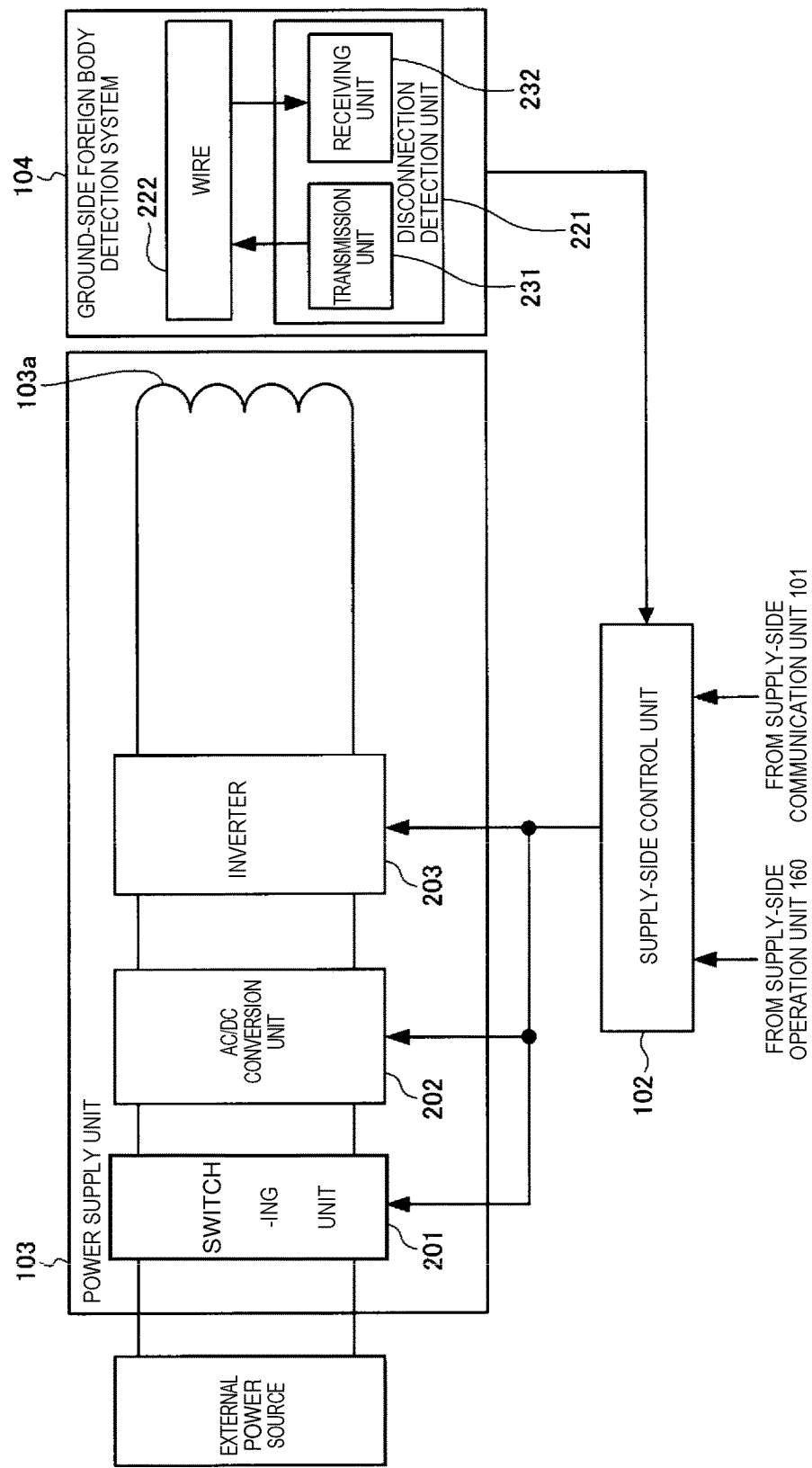
FIG. 2 is a block diagram illustrating internal configurations of a power supply unit and a ground-side foreign object detection system, illustrated in FIG. 1.
Figure 3:
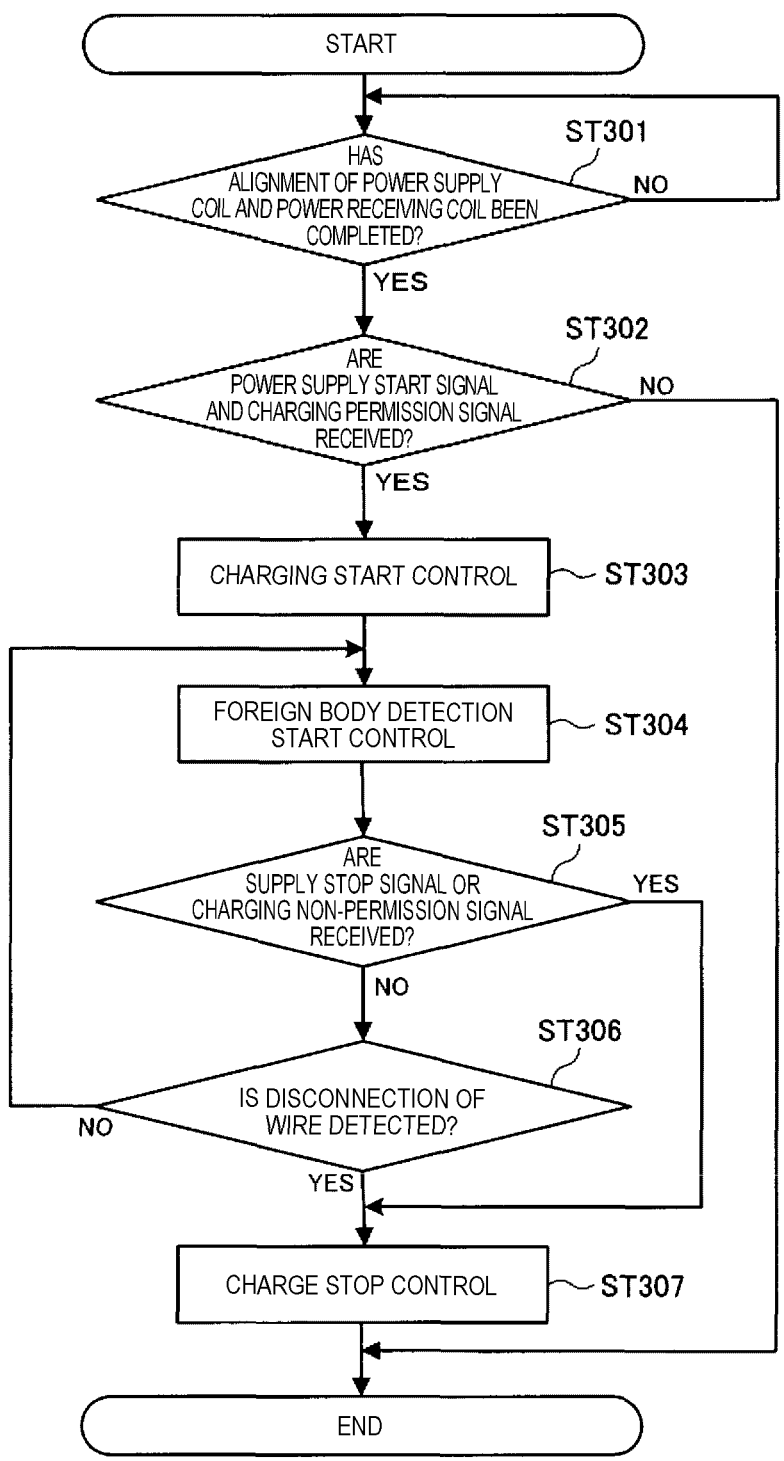
FIG. 3 is a flowchart illustrating an operation of a supply-side controller illustrated in FIG. 2.

Next, the operation of supply-side controller 102 illustrated in FIG. 2 will be described with reference to FIG. 3.

First, supply-side controller 102 determines whether or not alignment has been completed, in which power receiving coil 154a is positioned on power supply coil 103a (step ST301). For example, supply-side controller 102 determines whether or not power receiving coil 154a is positioned on power supply coil 103a by acquiring an image captured by a camera, not illustrated, which is mounted in vehicle 150, from supply-side communication unit 101 through vehicle-side communication unit 155, and analyzing the acquired image.

If the alignment is not completed (step ST301: NO), supply-side controller 102 repeats the process of step ST301.

Meanwhile, if the alignment is completed (step ST301: YES), supply-side controller 102 determines whether or not a power supply start signal is received from supply-side operation unit 160, and a charging permission signal is received from supply-side communication unit 101 (step ST302).

If it is determined that the power supply start signal and the charging permission signal are not received (step ST302: NO), supply-side controller 102 controls switching unit 201 so as not to start power supply.

If it is determined that the power supply start signal and the charging permission signal are received (step ST302: YES), supply-side controller 102 performs control of the charging start, controls switching unit 201 and AC/DC conversion unit 202, and activates inverter 203 (step ST303).

Further, supply-side controller 102 controls ground-side foreign object detection system 104 so as to start foreign object detection (step ST304).

Supply-side controller 102 determines whether or not a supply stop signal is received from supply-side operation unit 160, or a charging non-permission signal is received from supply-side communication unit 101 (step ST305). When the supply stop signal or the charging non-permission signal is received (step ST305: YES), the process proceeds to step ST307.

When the supply stop signal or the charging non-permission signal is not received (step ST305: NO), supply-side controller 102 determines whether or not disconnection of wire 222 is detected by disconnection detection unit 221 (step ST306). If disconnection is not detected (step ST306: NO), the process returns to step ST304.

If disconnection is detected (step ST306: YES), supply-side controller 102 performs control of the charge stop, and controls switching unit 201 and AC/DC conversion unit 202 so as to stop inverter 203 (step ST307). In other words, in step ST307, the power supply to power supply coil 103a is stopped. In addition, here, the power supply to power supply coil 103a may be reduced. In addition, in step ST307, supply-side controller 102 may cause a notification unit (not illustrated) to notify of the presence of a foreign object.

Thus, if the disconnection of wire 222 is detected during the power supply, a foreign object generates heat by the magnetic flux and dissolves wire 222, such that supply-side controller 102 determines that the foreign object is present in power supply coil 103a, and the power supply to the power supply coil 103a is stopped or reduced as the control for preventing the temperature rise of the foreign object. Thus, regardless of the adhesion of dirt to ground-side foreign object detection system 104, it is possible to detect a foreign object. Furthermore, since a non-magnetic material that does not generate heat by the magnetic flux does not dissolve wire 222, such a non-magnetic material can be prevented from being erroneously detected as a foreign object.

<Configuration of Ground-Side Foreign Object Detection System>

Figure 4:
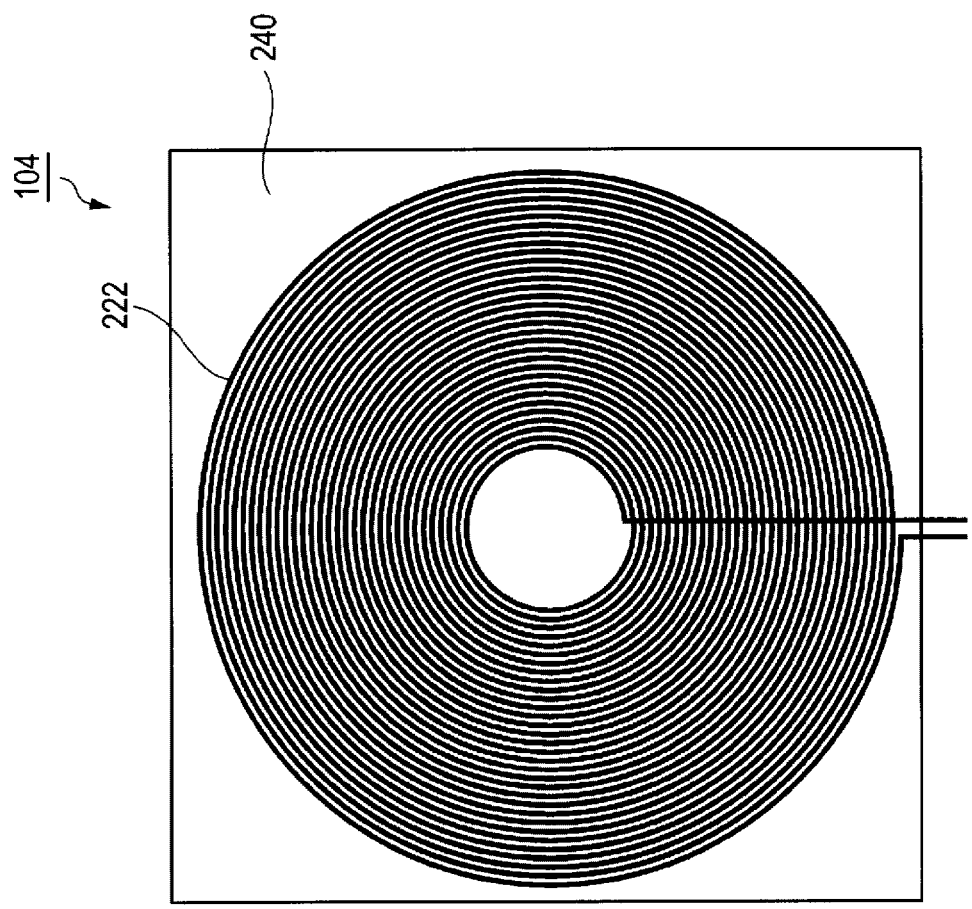
FIG. 4 is a top view illustrating a configuration of the ground-side foreign object detection system illustrated in FIG. 1.
Figure 5:
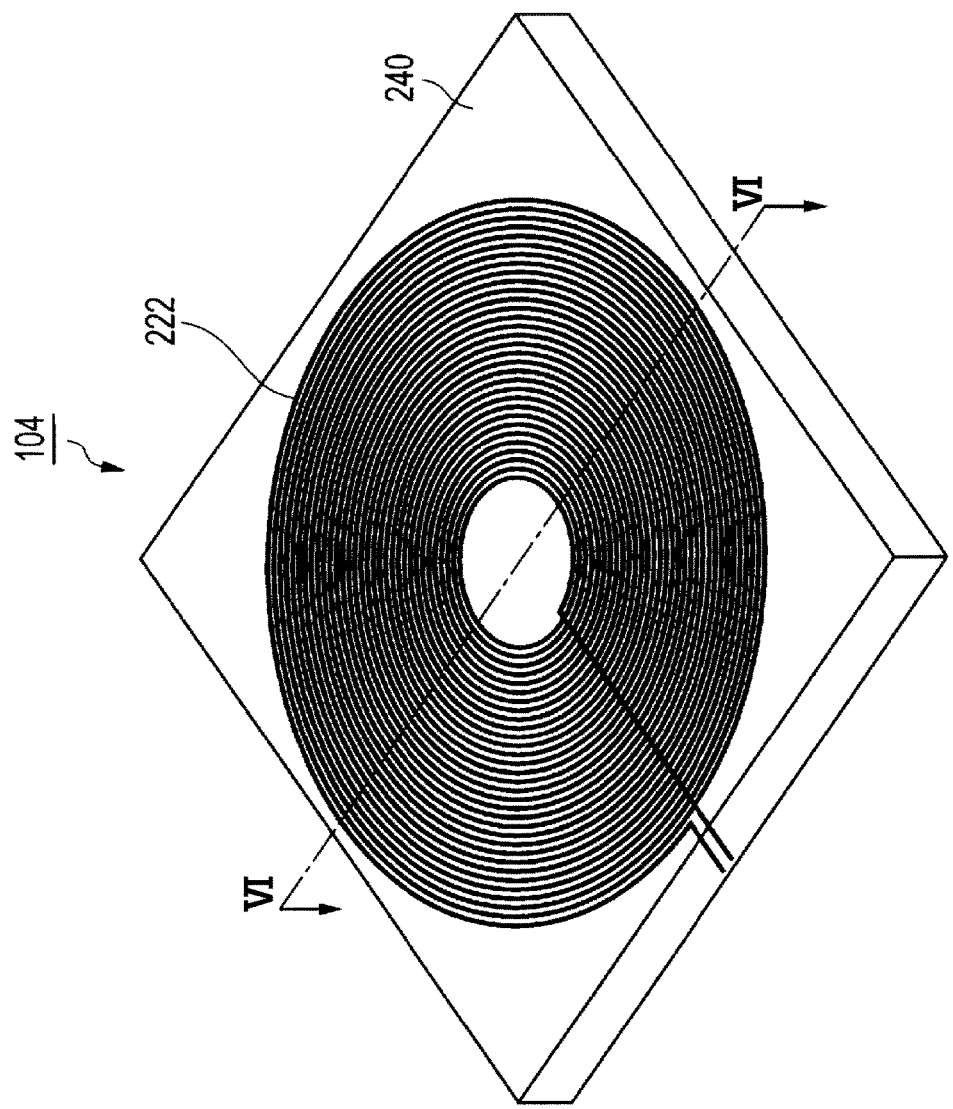
FIG. 5 is a perspective view illustrating a configuration of the ground-side foreign object detection system illustrated in FIG. 1.
Figure 6:
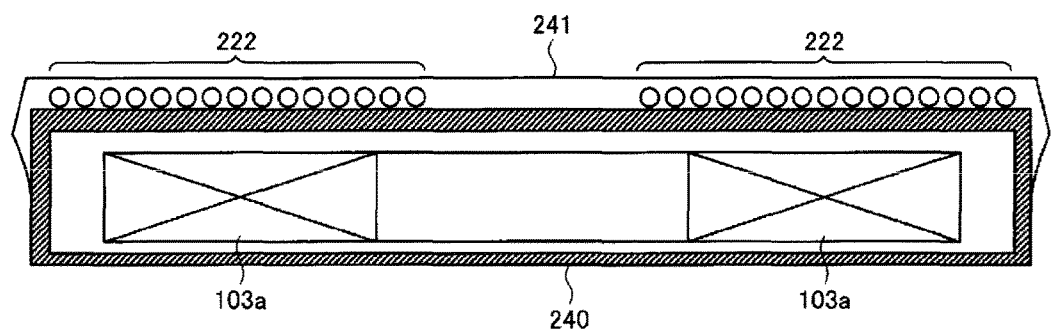
FIG. 6 is a cross-sectional view taken along line VI-VI of FIG. 5.

FIG. 4 is a top view illustrating a configuration of ground-side foreign object detection system 104 illustrated in FIG. 1, FIG. 5 is a perspective view illustrating a configuration of ground-side foreign object detection system 104, and FIG. 6 is a cross-sectional view taken along line VI-VI of FIG. 5.

Wire 222 of a spiral shape is disposed near a top face outside case (housing) 240 so as to cover the upper side of power supply coil 103a. Thus, it is possible to detect even a small foreign object by arranging wire 222 in a spiral shape. Here, at least a portion of wire 222 may be arranged so as to overlap itself near the top face of case 240 to which the shape of power supply coil 103a is projected. Further, the heat-resistant temperature of wire 222 is set to be lower than the heat-resistant temperature of case 240 (at a temperature between the surface highest predicted temperature (for example, 70° C.) and the heat-resistant temperature (for example, 240° C.), for example, 170° C.), and wire 222 is dissolved before the case 240 is dissolved. However, the efficiency of the power supply from power supply coil 103a to power receiving coil 154a is not reduced, and there is no problem with the power supply, due to the presence of wire 222.

Case 240 accommodates power supply coil 103a and a substrate or the like, not illustrated, the bottom of case 240, for example, has an area of 30 cm×20 cm or more, and the heat-resistance temperature of case 240 is for example, 240° C.

Sheet 241 is made of resin material such as rubber, and covers and seals wire 222, which is placed on the top of case 240. Further, sheet 241 has the same degree of heat-resistance temperature as wire 222, and when wire 222 dissolves, sheet 241 also dissolves. In addition, wire 222 may be embedded in sheet 241. In addition, sheet 241 has a dual structure, and the load bearing properties may be improved. Thus, since wire 222 is sealed by sheet 241, it is possible to protect wire 222 from dirt and scratches, and easily replace the dissolved wire 222. Incidentally, sheet 241 is not an essential constituent, and only wire 222 may be provided on the top face of case 240.

<Effects of the Exemplary Embodiment>

Thus, in this embodiment, wire 222 that dissolves at a temperature lower than the heat-resistant temperature of the case is arranged in a spiral shape so as to cover the power supply coil 103a, a signal is continuously to be sent to wire 222 during the power supply, and if it is not possible to receive the signal through wire 222, it is determined that a foreign object has been detected. Thus, regardless of the attachment of dirt and snow to ground-side foreign object detection system 104, it is possible to detect a foreign object. In addition, since a non-magnetic material or a foreign object of a small size is unlikely to generate heat by the magnetic flux, and do not dissolve wire 222, it is possible to accurately detect only a heat generating foreign object. In addition, it is also possible to arbitrarily set the size of a foreign object to be detected, depending on the arrangement of the wire. Moreover, it is possible to realize a foreign object detection system with an inexpensive member, thereby reducing costs.

<Variation of the Housing Method of Wire>

Figure 7:
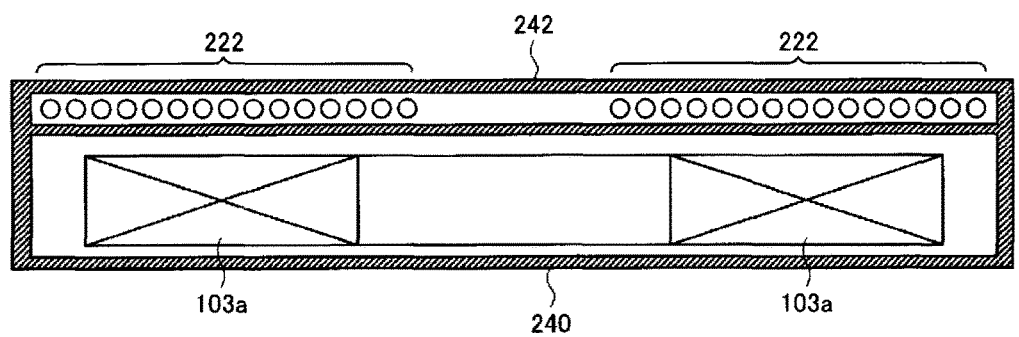
FIG. 7 is a cross-sectional view illustrating Variation 1 of a wire accommodation method.

In addition, although the case where wire 222 is covered with sheet 241 has been described in the embodiment, the present invention is not limited thereto. For example, as illustrated in FIG. 7, wire 222 that is arranged near the top face outside case 240 may be covered with case (housing) 242 having a higher heat-resistant temperature than wire 222, and strength. In this case, if a foreign object is present on case 242, heat generated from the foreign object reaches wire 222 through case 242, and wire 222 dissolves before case 242 dissolves.

Figure 8:
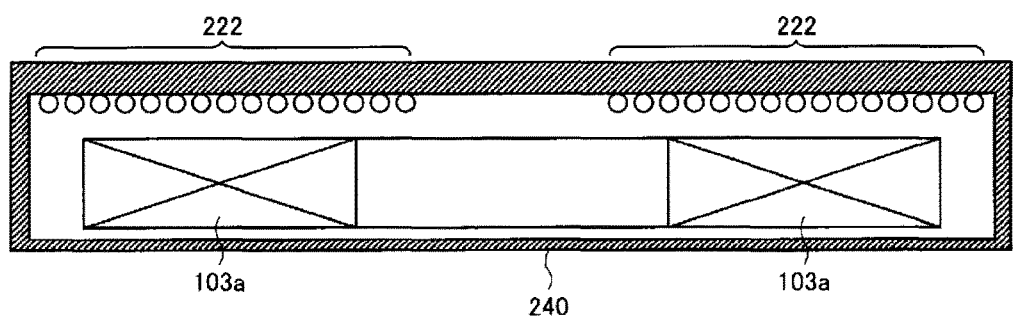
FIG. 8 is a cross-sectional view illustrating Variation 2 of a wire accommodation method.

Further, as illustrated in FIG. 8, wire 222 may be arranged near an underside of the top face inside case 240. In this case, it is possible to reduce the number of parts. Further, in this case, if a foreign object is present on case 240, heat generated from the foreign object reaches wire 222 through case 240, and wire 222 dissolves before case 240 dissolves.

Figure 9:
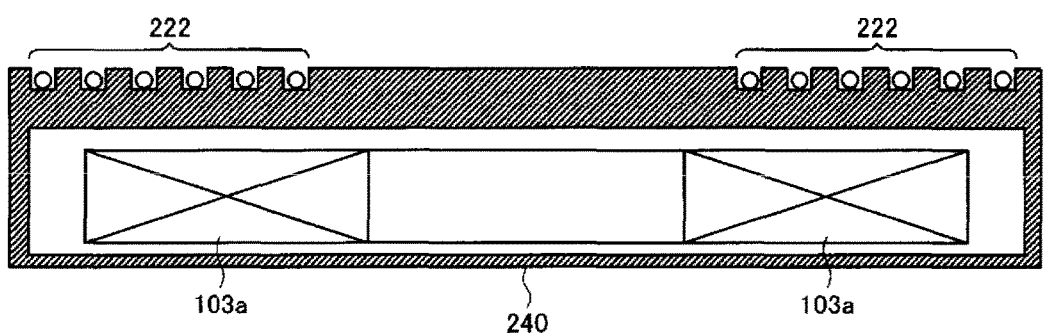
FIG. 9 is a cross-sectional view illustrating Variation 3 of a wire accommodation method.

Further, as illustrated in FIG. 9, grooves are provided in the upper surface (top face) of case 240, to which the shape of power supply coil 103a is projected, and wire 222 may be arranged along the grooves. In this case, it is possible to reduce the number of parts, and easily replace wire 222.

Figure 10:
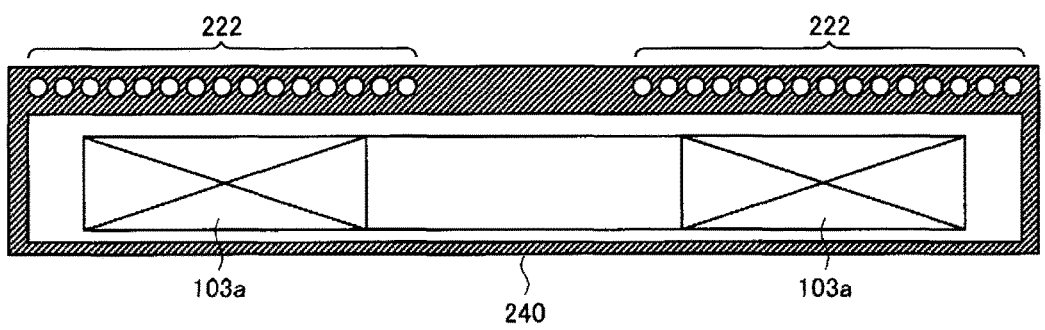
FIG. 10 is a cross-sectional view illustrating Variation 4 of a wire accommodation method.

Further, as illustrated in FIG. 10, wire 222 may be arranged within the top face t of case 240. In this case, similar to FIG. 8, if a foreign object is present on case 240, heat generated from the foreign object reaches wire 222 through case 240, and wire 222 dissolves before case 240 dissolves.

<Variation of Arrangement of Wire>

Figure 11:
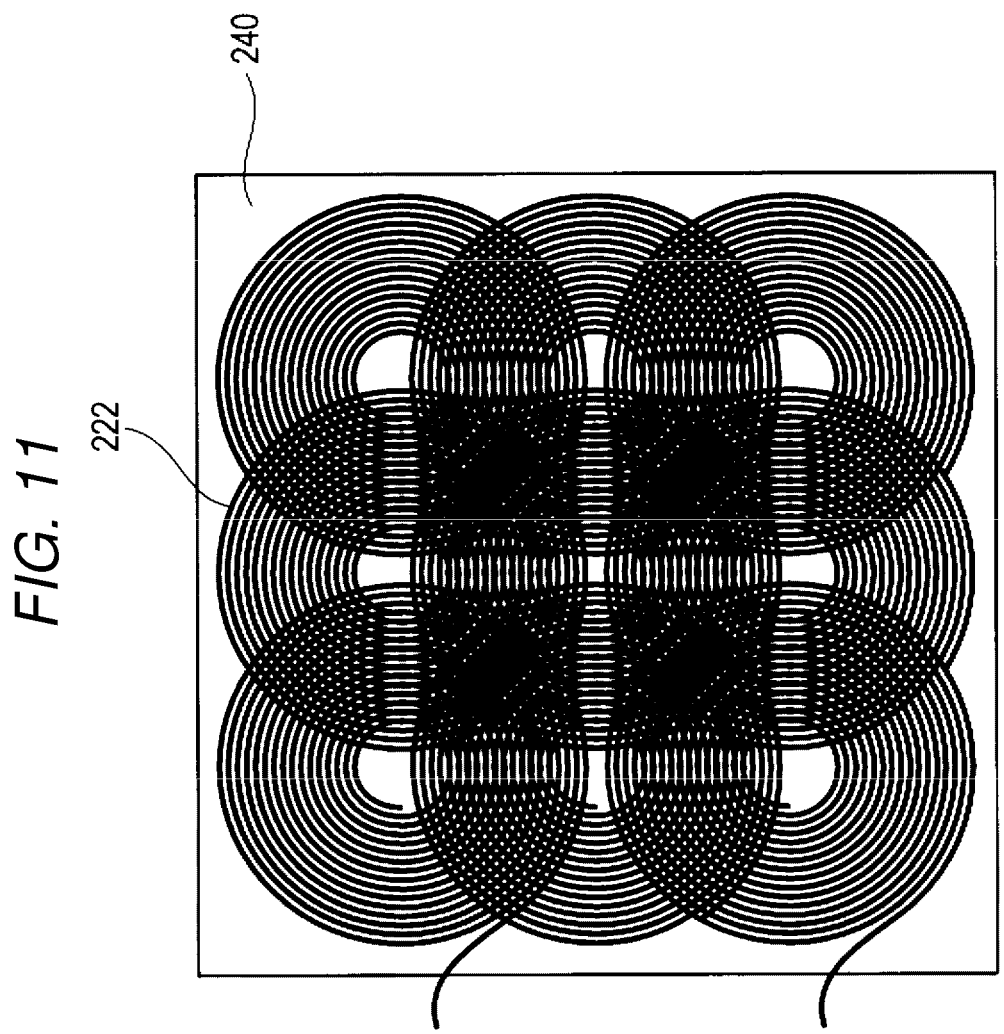
FIG. 11 is a top view illustrating a configuration of a ground-side foreign object detection system in Variation 1 of the arrangement of a wire.
Figure 12:
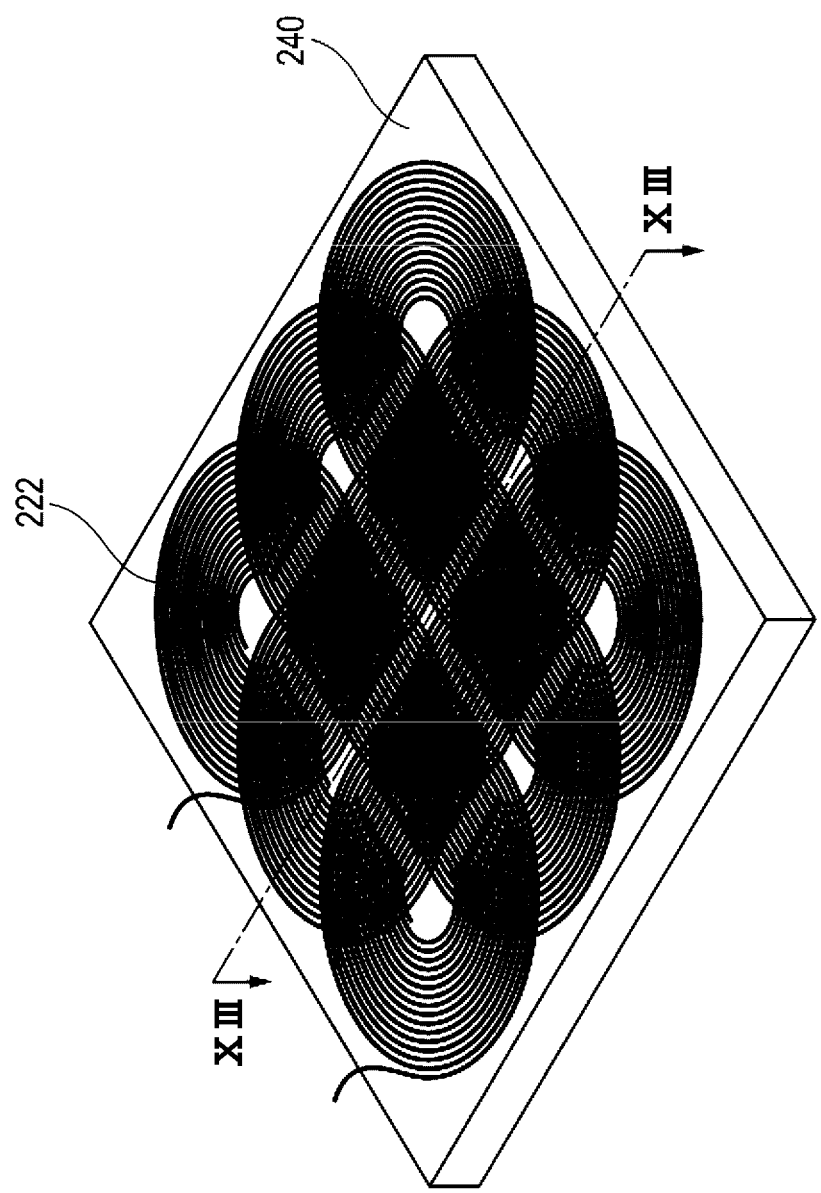
FIG. 12 is a perspective view illustrating the configuration of a ground-side foreign object detection system in Variation 1 of the arrangement of a wire.
Figure 13:
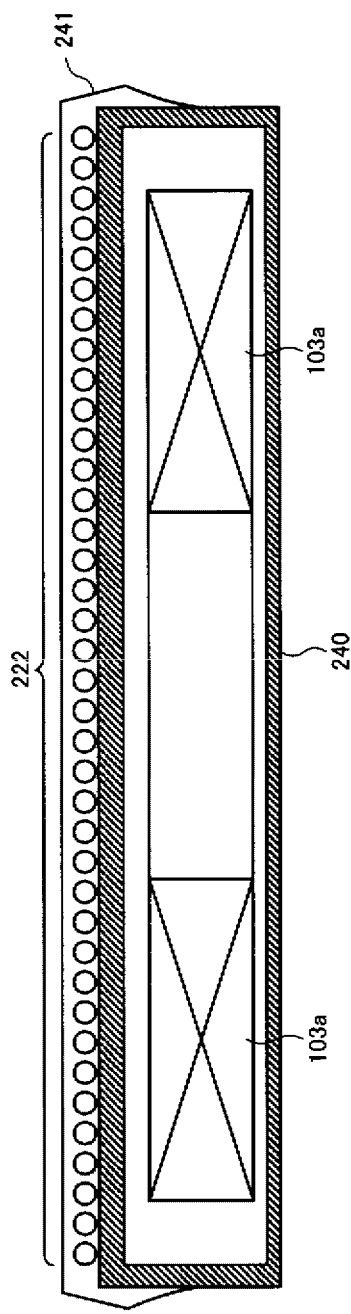
FIG. 13 is a cross-sectional view taken along line X III-X III of FIG. 12.

Further, although the case where wire 222 is arranged in a spiral shape has been described in the present embodiment, the present invention is not limited thereto. For example, as illustrated in FIGS. 11 to 13, wire 222 may be arranged in a plurality of spiral shapes. Thus, when power supply coil 103a is a solenoid coil, it is possible to cover the entire solenoid coil, and eliminate detection leakage or oversight of a foreign object.

Figure 14:
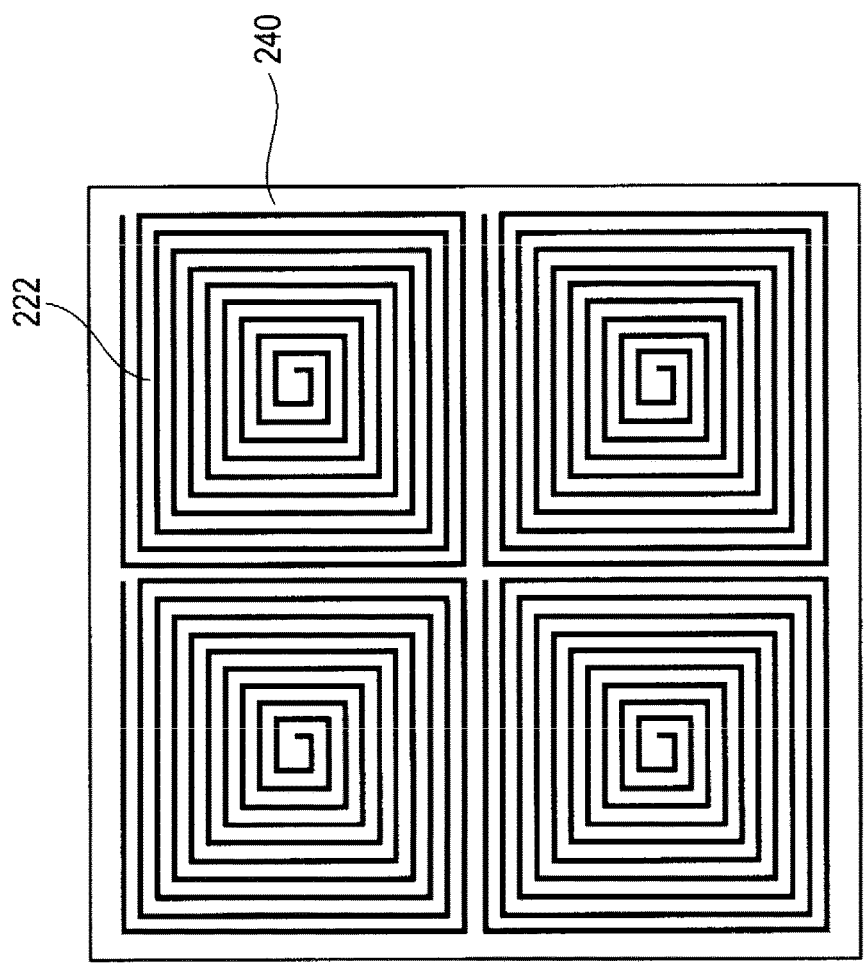
FIG. 14 is a top view illustrating a configuration of a ground-side foreign object detection system in Variation 2 of the arrangement of a wire.
Figure 15:
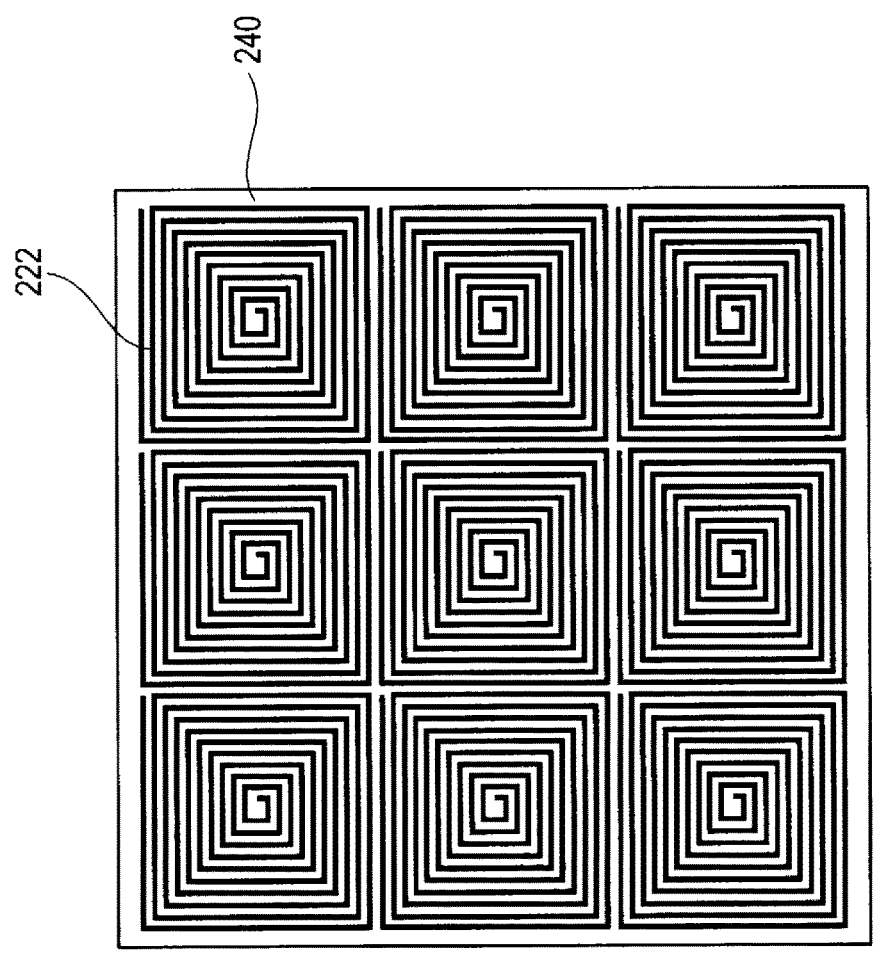
FIG. 15 is a top view illustrating a configuration of a ground-side foreign object detection system in Variation 3 of the arrangement of a wire.

Further, as illustrated in FIGS. 14 and 15, wires 222 may be arranged in a plurality of rectangular spiral shapes. Here, since individual wire 222 is connected with transmission unit 231, and receiving unit 232, it is sufficient to replace only dissolved wire 222, such that it is possible to reduce the cost. Further, in FIGS. 14 and 15, wire 222 has a rectangular spiral shape, but may have a circular spiral shape.

Further, as illustrated in FIG. 16, a plurality of wires 222 which are arranged in parallel may be connected with each other by relay connector 250 at the ends of wires 222. In the case of applying the optical fiber to wire 222, the optical fiber has a weak property to bending. Therefore, it is possible to cover the upper side of power supply coil 103a with the optical fiber, by using relay connector 250, without bending the optical fiber.

<Vehicle-side Foreign Object Detection System>

Although the case where ground-side foreign object detection system 104 is provided in power supply device 100 on the ground side has been described in the present embodiment, as illustrated in FIG. 17, the foreign object detection system may be provided in power receiving unit 154 on the vehicle side. On the vehicle side, it is considered that a foreign object producing from a tire while the vehicle is traveling is attached to power receiving unit 154, or a foreign object is deliberately attached by mischief.

Vehicle-side foreign object detection system 105 has the same configuration as ground-side foreign object detection system 104, and if disconnection detection unit 221 detects the disconnection of wire 222, vehicle-side controller 153 causes vehicle-side communication unit 155 to generate a charging non-permission signal, and notifies supply-side controller 102 of the charging non-permission signal through supply-side communication unit 101. Thus, it is possible to stop the power supply.

Further, although the description has been made that disconnection detection unit 221 detects the disconnection of wire 222 in the present embodiment, in the present embodiment, it is sufficient to detect the dissolution of wire 222, without need of detecting the disconnection.

Further, although the case of applying the foreign object detection system to the contactless power supply system that supplies power to a vehicle has been described as an example in the present embodiment, the present invention is not limited thereto, and the foreign object detection system may be applied to any other contactless power supply systems that supply power to mobile terminals such as mobile phones, notebook computers, and tablets, TVs, beauty equipment, lighting, industrial equipment, electric motorcycle, displays, and the like.

INDUSTRIAL APPLICABILITY

A contactless power supply device and a contactless power receiving device according to the present invention can be applied to detection of a heat-generating foreign object, regardless of the adhesion of dirt.

The invention claimed is:

1. A contactless power supply device supplying power in a contactless manner, comprising:
   a power supply coil configured to generate an electromagnetic field and to supply power;
   a case housing the power supply coil; and
   a wire having a dissolving temperature and adjacent to a part of the case,
   wherein the contactless power supply device is configured to generate an electromagnetic field of the power supply coil, based on dissolution of the wire,
   wherein the part of the case has a heat-resistant temperature, and
   wherein the dissolving temperature of the wire is lower than the heat-resistant temperature of the part of the case.

2. The contactless power supply device according to claim 1, further comprising:
   a sheet material for covering the wire.

3. The contactless power supply device according to claim 1,
   wherein the wire is embedded in a sheet material.

4. The contactless power supply device according to claim 1,
   wherein the wire is provided near a top face outside the case, near an underside of the top face inside the case, or within the top face of the case.

5. The contactless power supply device according to claim 4,
   wherein at least a portion of the wire is provided near a top face outside the case, near an underside of the top face inside the case, or within the top face of the case, and a shape of the power supply coil can be projected to those portions.

6. The contactless power supply device according to claim 1,
   wherein the wire is provided near a top face outside the case, and is covered by another case.

7. The contactless power supply device according to claim 1,
   wherein at least a portion of the wire is disposed along a groove provided in a top face of the case to which a shape of the power supply coil is projected.

8. The contactless power supply device according to claim 1,
   wherein the wire is a signal line, and
   when a signal transmitted through the signal line is interrupted, such interruption indicates that the wire is dissolved.

9. The contactless power supply device according to claim 8,
   wherein the wire is an optical fiber.

10. The contactless power supply device according to claim 9,
    further comprising a dissolution detection unit that includes:
    a light emitting unit that emits an optical signal; and
    a light receiving unit that receives the optical signal,
    wherein it is detected that the wire is dissolved when the light receiving unit does not receive the optical signal.

11. The contactless power supply device according to claim 1,
    wherein the wire is a member that does not interfere with supply of the power.

12. The contactless power supply device according to claim 1,
    wherein when the dissolution of the wire is detected, a controller performs control to prevent a temperature rise of a foreign object which dissolves the wire.

13. The contactless power supply device according to claim 12,
    wherein the controller stops or decreases power supply to the power supply coil.

14. The contactless power supply device according to claim 1, further comprising:
    a notification unit for notifying of a presence of a foreign object which dissolves the wire,
    wherein when the dissolution of the wire is detected, a controller prompts the notification unit to make notification of the presence of the foreign object.

15. The contactless power supply device according to claim 1,
    wherein the contactless power supply device is installed on a ground side, and supplies power to a power receiving device provided in a vehicle.

16. A contactless power receiving device receiving power in a contactless manner, comprising:
    a power receiving coil for receiving power by an electromagnetic field generated by a contactless power supply device;
    a case housing the power receiving coil; and
    a wire having a dissolving temperature and adjacent to a part of the case,
    wherein the contactless power supply device is configured to generate an electromagnetic field of a power supply coil, based on dissolution of the wire,
    wherein the part of the case has a heat-resistant temperature, and
    wherein the dissolving temperature of the wire is lower than the heat-resistant temperature of the part of the case.

17. The contactless power receiving device according to claim 16,
    wherein the contactless power receiving device is installed in a vehicle, and receives power from the power supply device provided on a ground side.

* * * * *